Figure 1:
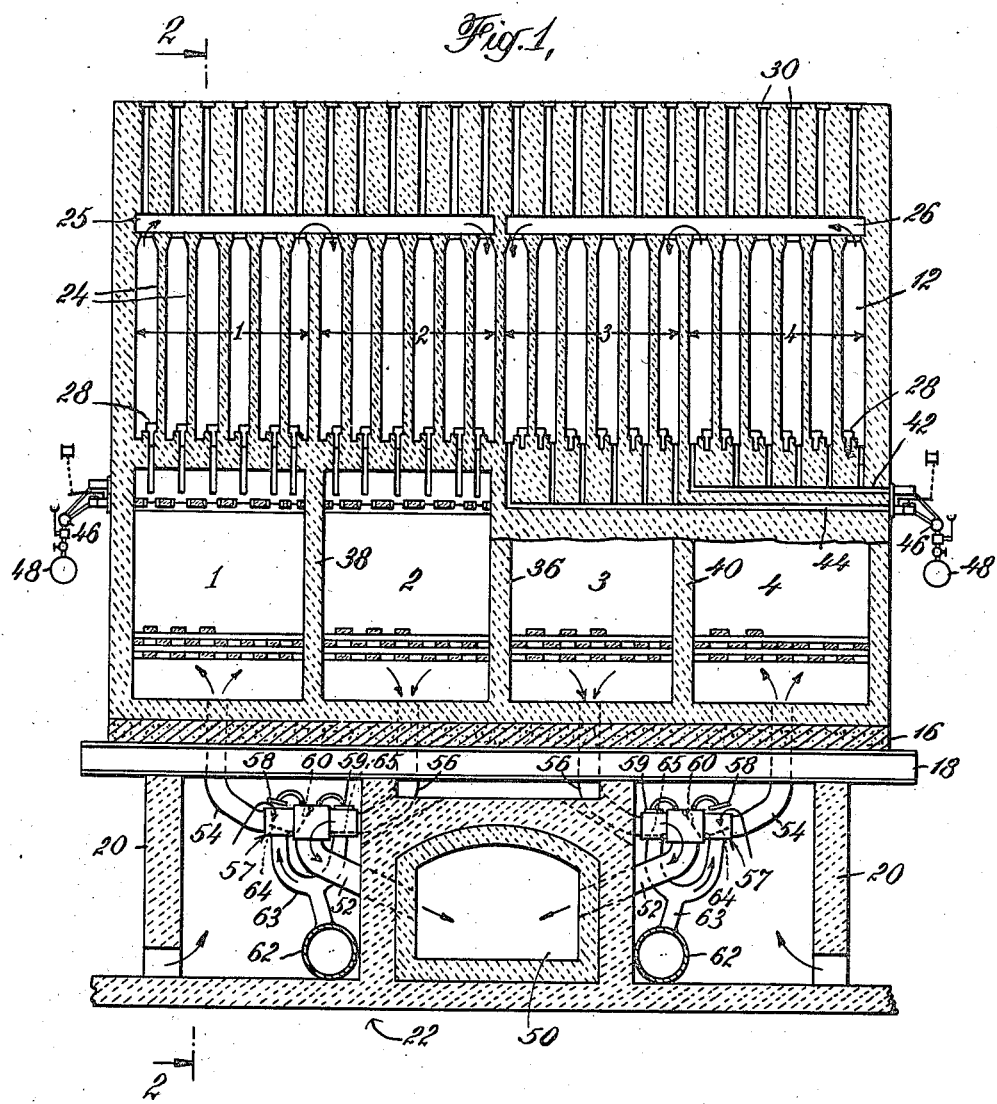

Jan. 19, 1943. O. M. TWEIT 2,309,028
COKE OVEN BATTERY
Filed May 25, 1940 2 Sheets-Sheet 1

INVENTOR
Olav M. Tweit
BY Gordon A. Wilkins
ATTORNEY

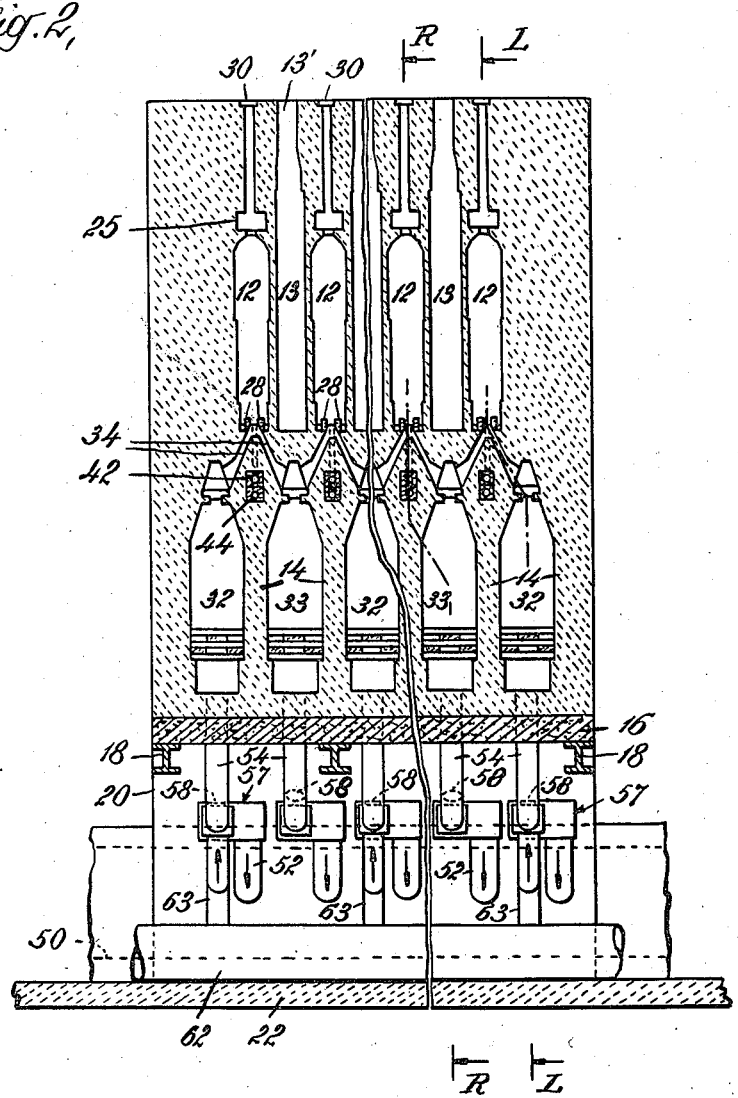

Patented Jan. 19, 1943

2,309,028

UNITED STATES PATENT OFFICE 2,309,028

COKE OVEN BATTERY

Olav Michael Tweit, Mountain Lakes, N. J., assignor to Semet-Solvay Engineering Corporation, New York, N. Y., a corporation of New York Application May 25, 1940, Serial No. 337,166

3 Claims. (Cl. 202—144)

This invention relates to coke ovens and more particularly to reversible regenerative coke oven batteries.

Coke oven batteries of the type disclosed in Schrader et al. Patent No. 1,947,500 of February 20, 1934, involving coking chambers alternating with flued heating walls, and rows of regenerators extending transversely of the battery beneath the coking chambers and heating walls, each row involving two pairs of regenerators arranged end to end so that one regenerator of each pair operates for inflow while the other operates for outflow, have been found to be particularly efficient and desirable coking apparatus. Heretofore such coke oven batteries have ordinarily involved two waste gas chimney flues, one extending along each side of the battery, and a system of regenerator sole channels for supplying air and combustible gas to the regenerators and for conducting products of combustion from the regenerators to the chimney flues.

It is an object of the invention to provide a novel regenerative coke oven battery which is more economical to build and maintain and is more efficient in operation than the batteries heretofore known.

It is a further object of the invention to provide a coke oven battery of simpler structure than the prior art batteries. Other objects and advantages will appear hereinafter.

The oven battery of the invention comprises horizontally elongated coking chambers separated by vertically flued heating walls, a plurality of pairs of regenerators arranged in end to end relation beneath the coking chambers and heating walls and a single waste gas chimney flue extending longitudinally of the battery beneath the regenerators and connected to the bottoms of the regenerators by gas flow connections including reversing valves so that gas to be preheated may be introduced into one regenerator of each pair while products of combustion from the other regenerator of the pair flow into the chimney flue. The coke oven battery may be fired with coke oven gas in which case air is preferably preheated in all of the inflow regenerators; if the battery is fired with lean combustible gas requiring preheating such as blast furnace or producer gas, such gas is preheated in alternate inflow regenerators lengthwise of the batteries while air is preheated in the remaining inflow regenerators.

The use of a single waste gas chimney flue located below and communicating with the bottoms of all the regenerators materialy simplifies the construction of the coke oven battery without deleteriously affecting its operation, since the single chimney flue accomplishes all of the functions of the two waste gas chimney flues customarily employed in prior art constructions and renders unnecessary a complicated arrangement of sole channels for supplying air or air and combustible gas to the regenerators. Furthermore, owing to the introduction of gas directly into the bottoms instead of at the sides of the regenerators, the invention promotes uniform distribution of gas in the regenerators and combustion flues with resultant more uniform heating of the battery. The amount of fuel gas and air supplied to each half of the battery may be regulated independently of that supplied to the other half to maintain the desired temperature conditions on each side of the battery.

For a more complete understanding of the invention reference should be had to the accompanying drawings forming a part of this specification and showing for purposes of exemplification one form of the invention in which, Figure 1 is a transverse sectional view through a coke oven battery, the left and right hand halves of the view being taken on lines L—L and R—R respectively of Figure 2, and Figure 2 is a longitudinal sectional view through the battery taken on line 2—2 of Figure 1.

Referring to the drawings there is shown in Figures 1 and 2 a combination by-product coke oven embodying in its construction a plurality of heating walls 12 and a plurality of intermediate crosswise extending horizontally elongated coking chambers 13 equipped with charging openings 13'. The heating walls form the side walls of the respective coking chambers, the heating walls and the coking chambers together with the superstructure of the oven battery being supported by massive supporting walls 14 positioned directly beneath the heating walls 12. The supporting walls rest on and are supported by a flat mat or pad 16, preferably of concrete or other suitable material, which is in turn supported by a plurality of steel I-beams 18 resting on walls 20 of the foundation 22.

Each heating wall 12 is composed of a plurality of vertical combustion flues formed by transverse flue walls 24. The flues of each heating wall are operatively disposed in four groups of consecutive flues, the groups being numbered for convenience 1, 2, 3 and 4, each group of flues being constituted of a convenient number of flues, six in the embodiment shown on the drawings, and the flues of each group operating concurrently for flow in the same direction. During one cycle of operation indicated by the arrows in Figure 1, the flues of groups 1 and 4 operate concurrently as inflow flues while similarly the flues of groups 2 and 3 operate concurrently as outflow flues, although, if desired, groups 1 and 3 may operate concurrently for inflow and groups 2 and 4 for outflow. The tops of flue group 1 are communicably connected with the tops of flue group 2 by horizontal passage or bus flue 25, while flues of groups 3 and 4 are interconnected by the horizontal bus flue 26. Flow through the vertical flues and bus flues may be regulated in a well known manner by slide bricks (not shown) located in the bus flues. Slide or damper bricks 28 are also provided at the bases of the vertical flues for regulating flow from the regenerators, hereinafter described, to the flues. Access flues 30 also extend from the tops of the vertical flues for the purpose of affording access to gas nozzles located in the bottoms of the combustion flues.

The rows of regenerators 32, 33 containing heat-storing refractory material such as checkerbrick are located beneath the coking chambers 13 and extend crosswise of the battery between the supporting walls 14. Ducts 24 connect the regenerators with adjacent heating walls. In the middle lengthwise vertical plane of the battery, a vertical partition wall 36 is positioned running the full length of the battery and extending from the bottom of the regenerators to the top of the battery. Partition wall 38 divides the regenerator sections at one side of the battery into two chambers numbered for convenience 1 and 2, regenerator chambers 1 being connected to group 1 of the flues and regenerator chamber 2 being connected to group 2 of the flues in the pair of heating walls defining the coking chamber immediately above the regenerator. Likewise, partition wall 40 divides the regenerator sections at the coke side of the battery into two chambers 3 and 4, chamber 3 being connected to group 3 and chamber 4 to group 4 of the flues in the pair of heating walls defining the coking chamber above. It will be observed the partition walls divide the regenerators and connected groups of flues into two reversible pairs of regenerators and flue groups, the respective pairs being located on opposite sides of the battery thereby permitting independent control of the supply of air and combustible gas to the opposite sides of the battery in a manner to be more fully described hereinafter.

Extending crosswise of the battery in the heating walls beneath the base of the heating flues from each side of the battery are two series of coke oven gas supply channels 42 and 44 connected through valve controlled connection pipes 46 with coke oven gas supply mains 48.

Located beneath the regenerators and extending along the longitudinal central vertical plane of the battery is waste gas chimney flue 50 communicating through ducts 52, 54 and 56, and reversing valve arrangement designated as a whole by reference numeral 57 with the bottoms of each pair of regenerators 1 and 2. Each valve assembly may include an air valve 58 for regenerator chamber 1 and air valve 59 for regenerator chamber 2 and a valve 60 for establishing communication alternately between conduit 52 leading into the chimney flue and conduits 54 and 56 leading from the valve assembly to the bottoms of the regenerators. Similar connections establish communication between chimney flue 50 and regenerator sections 3 and 4 on the right hand side of the battery as viewed in Figure 2.

If desired an extraneously derived lean combustible gas requiring preheating, such as producer gas, may be supplied to the battery through mains 62 connected by conduits 63 and valves 64, 65 with the conduits 54 and 56 leading to the base of alternate regenerators lengthwise of the battery.

In operating the battery with coke oven gas fuel, producer gas valves 64, 65 are closed, air is permitted to flow into all of the inflow regenerators, say regenerators 1 and 4, through valves 58, the valves 60 being positioned to establish communication through conduits 56 between regenerators 2 and 3 and waste gas flue 50. Coke oven gas is simultaneously introduced into the flues of groups 1 and 4 through channels 42 and the products of combustion resulting from burning of the gas in the flues pass downwardly through regenerators 2 and 3, conduits 56, valves 60 and conduits 52, into chimney flue 50 and are discharged through a stack (not shown) at one end of the battery. Upon reversal of the battery, coke oven gas is supplied through channels 44 to flue groups 2 and 3 and air is supplied to all of the regenerators 2 and 3 through valves 59 and conduits 56. The products of combustion pass downwardly through regenerators 1 and 4, conduits 54 and 52, thence into the chimney flue.

In operating the battery with an extraneously derived gas requiring preheating, such as producer gas, the air valves 58, 59 for alternate rows of regenerators lengthwise of the battery, i. e. regenerator rows 32 (see Figure 2), are closed and the inflow regenerators of these rows, say regenerators 1 and 4, are supplied with producer gas from the mains 62 through conduits 63 and valves 64, air being supplied to the inflow regenerators 1 and 4 of rows 33. The products of combustion flow through regenerators 2 and 3 and thence to the chimney flue. Upon reversal of the battery, producer gas valves 64 and air valves 58 are closed and producer gas valves 65 of regenerator rows 32 and air valves 59 of rows 33 are opened so that gas and air flow to alternate regenerators respectively. Reversal of the gas and air valves is effected by reversing mechanism (not shown) well known in the coke oven art.

It will be observed that the invention provides a coke oven battery construction involving in combination a plurality of pairs of regenerators extending in end to end relation crosswise of the battery and a single chimney flue located beneath and communicating with the bottoms of all of the regenerators, thus rendering unnecessary two chimney flues and the complicated arrangement of sole channels entering the sides of the regenerators customarily employed in prior art batteries. Gas, i. e. air or air and combustible gas, is introduced directly into and products of combustion are withdrawn directly from the middle portions of the bottoms of the regenerators, thus promoting uniform distribution of gas in the regenerators and flues and uniform heating of the coking chambers. The amount of gas and air supplied to each half of the battery may be controlled independently of that supplied to the other half, thus permitting maintenance of the desired heating conditions in each half independently of the other. The space beneath the regenerators in which the reversing valve mechanism is disposed may be made sufficiently high to permit an operator to move conveniently therethrough. By disposing the reversing valve mechanism in this space instead of at the sides of the battery as was customary heretofore, it is unnecessary to provide sheltered alleyways for this mechanism, the mechanism being sheltered by the oven battery proper.

The invention is particularly applicable to installations where soil conditions require a deep foundation. While the drawing discloses the invention in connection with a battery of the combination type, i. e. an oven adapted to be fired either with unpreheated coke oven gas or preheated lean fuel gas, it may be applied to other types of batteries, e. g. batteries fired solely with coke oven gas and combination or non-combination batteries of the underjet, underfired type in which coke oven gas is supplied to the flues through channels leading vertically through the masonry walls between the regenerators. Further, if desired each regenerator compartment may be divided by a partition extending along the median line from top to bottom thereof so as to divide it in half, each half being individual to a flue group of one heating wall instead of having a regenerator compartment communicating with the flue groups of a pair of heating walls as shown in the drawing. This change, it will be appreciated, will involve doubling the number of connecting passages and reversing valves between the regenerators and the chimney flue 50.

I claim:

1. A horizontal coke oven battery comprising in combination a plurality of coking chambers alternating with heating walls extending transversely of the battery, a plurality of vertical flues in said heating walls, a horizontal flue connecting the flues of each heating wall on one side of the battery at their tops, a second horizontal flue connecting the remainder of the flues of each heating wall at their tops, a partition separating said horizontal flues, a pair of reversible regenerators disposed in end to end relation at one side of the battery beneath each coking chamber and heating wall and communicating with the vertical flues connected by one of said horizontal flues, another pair of reversible regenerators disposed in end to end relation at the other side of the battery beneath each coking chamber and heating wall and communicating with the vertical flues connected by said other horizontal flue, a mat disposed beneath said regenerators, said oven battery being supported to provide a space therebeneath of a size such that an operator may conveniently move therein, a single chimney flue located beneath said regenerators in said space and extending along the central longitudinal vertical plane of the battery substantially midway between the sides thereof, gas flow conduits in said space leading downwardly through the mat from the bottom of all of said regenerators into said chimney flue and reversing valve connections in said space for each of said conduits whereby gas may be introduced through said conduits upwardly into the bottom of one regenerator of each pair and products of combustion discharged from the other regenerator of each pair into said chimney flue, and, upon reversal, gas is introduced into the bottoms of said last named regenerators of each pair and products of combustion are discharged from the first named regenerators of each pair into said chimney flue.

2. A coke oven battery comprising in combination coking chambers alternating with heating walls, reversible regenerators arranged in end to end relation transversely of said battery located beneath said coking chambers and heating walls, a mat disposed beneath said regenerators, a single chimney flue located directly beneath said regenerators and extending longitudinally of said battery between the sides thereof, individual conduits extending downwardly through the mat from the bottoms of individual regenerators and communicating with said chimney flue and reversing valves for said conduits for introducing gas through said conduits into the bottoms of haif of said regenerators and simultaneously establishing communication between the bottoms of the other half of said regenerators and said chimney flue, whereby said chimney flue receives the products of combustion from the entire battery.

3. A coke oven battery comprising in combination coking chambers alternating with heating walls, reversible regenerators arranged in end-to-end relation transversely of said battery located beneath said coking chambers and heating walls, a single chimney flue located directly beneath said regenerators and extending longitudinally of the battery between the sides thereof, with the top of said chimney flue at a level beneath the bottoms of said regenerators, individual conduits extending directly downwardly from the bottoms of individual regenerators and communicating with said chimney flue and reversing valves for said conduits for introducing gas through said conduits into the bottoms of half of said regenerators and simultaneously establishing communication between the bottoms of the other half of said regenerators and said chimney flue, whereby said chimney flue receives the products of combustion from the entire battery.

OLAV MICHAEL TWEIT.